Sept. 15, 1959 W. R. ZWOYER ET AL 2,904,304
AUTOMATIC WEIGHING MACHINE
Filed Nov. 20, 1953 4 Sheets-Sheet 1
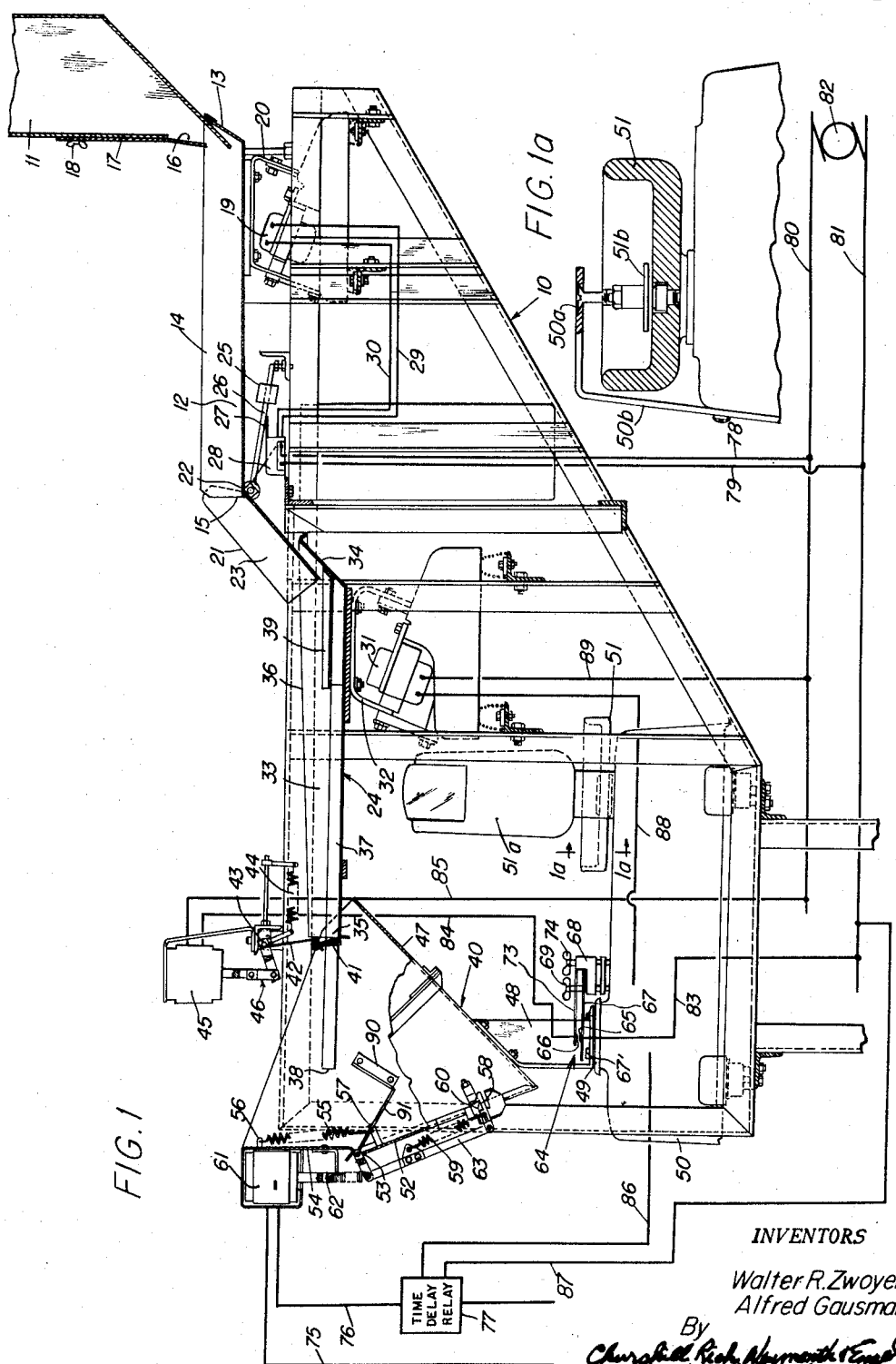
INVENTORS
Walter R. Zwoyer
Alfred Gausman
By
Churchill, Rich, Neymouth & Engel
Attorneys

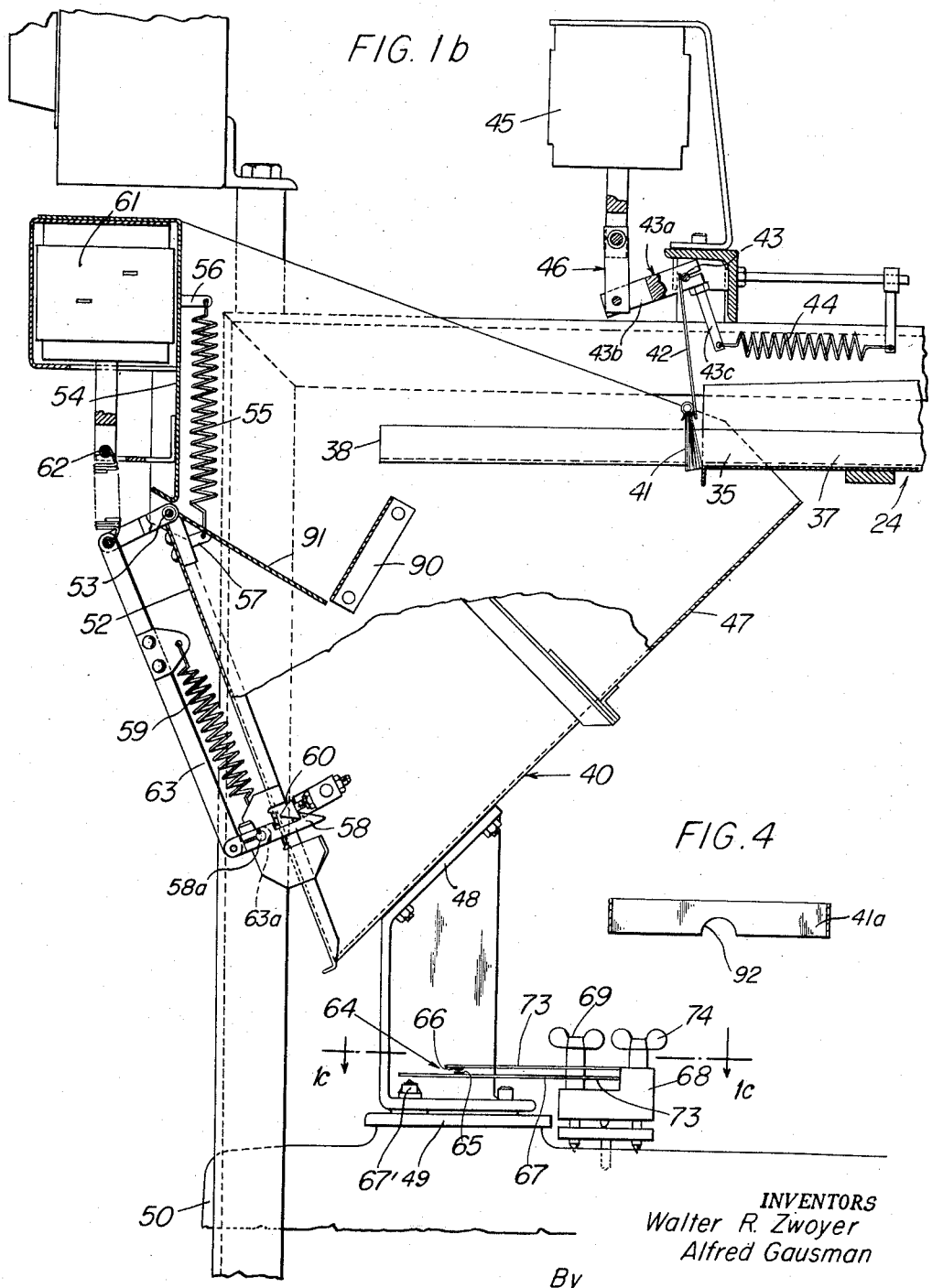

Sept. 15, 1959   W. R. ZWOYER ET AL   2,904,304
AUTOMATIC WEIGHING MACHINE
Filed Nov. 20, 1953   4 Sheets-Sheet 3

INVENTORS
Walter R. Zwoyer
Alfred Gausman
By
Churchill, Rich, Weymouth & Engel
Attorneys

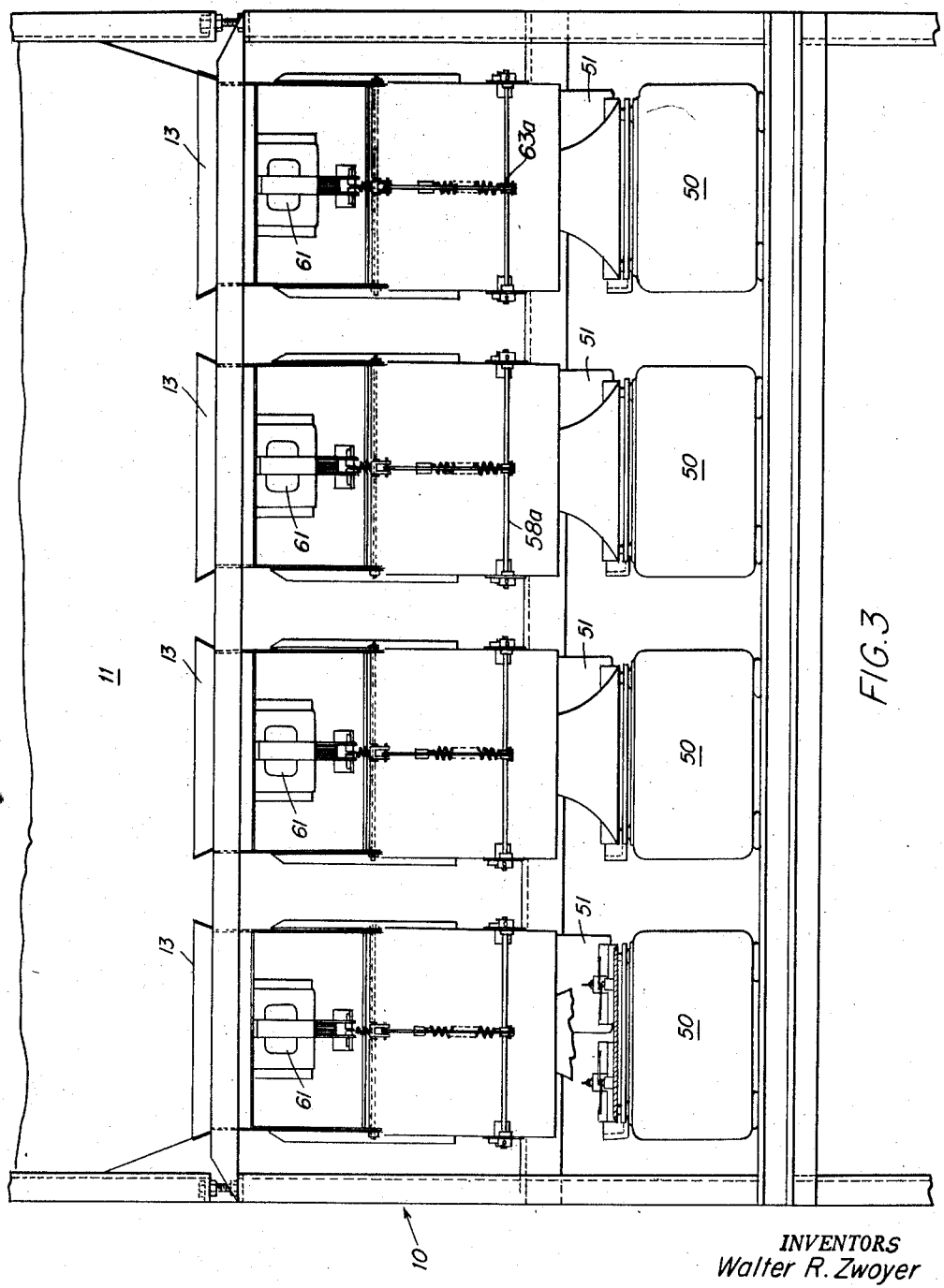

United States Patent Office 2,904,304
Patented Sept. 15, 1959

2,904,304
AUTOMATIC WEIGHING MACHINE

Walter R. Zwoyer, Maywood, N.J., and Alfred Gausman, West Hempstead, N.Y., assignors, by mesne assignments, to Package Machinery Company, East Longmeadow, Mass., a corporation of Massachusetts Application November 20, 1953, Serial No. 393,306

2 Claims. (Cl. 249—43)

This invention relates to an automatic weighing machine, and more particularly an automatic weighing machine for measuring in rapid succession equal net weight batches of material. The invention is especially useful in its application to apparatus for packaging foods in the form of discrete particles, to which use it is not necessarily restricted.

Heretofore, automatic weighing machines have been provided which weigh batches of discrete or flowable material exactly. However, such machines are expensive, relatively delicate, and their operation is relatively slow because of the necessary time required to dribble the final increments of material into the batch hopper or weighing pan.

We have now developed an automatic weighing machine for measuring exactly successive batches of discrete or flowable material which machine is relatively inexpensive, rugged, economical in its use of power, and rapid in its operation.

According to the invention, the material to be weighed is advanced by a vibrating trough to a batch hopper in which successive batches are weighed. When a weight nearly equal to the required net weight is in the hopper, the load receiver of the scales is sufficiently depressed to operate a switch and cut off the main material supply to the hopper. Substantially simultaneously with the operation of the switch, a minor weight equal to the difference in weight between the weight in the load receiver and the required net weight is picked up by the scale pan. Continued vibration of the trough supplies additional material to the batch hopper through a restricted dribble passage until the additional minor weight to equal the full net weight is on the load receiver. Thereupon, a second switch is operated by the further depression of the load receiver, vibration is halted and the material supply to the batch hopper is completely cut off.

The switches operated by the positions of the load receiver are adjustable to permit use of the apparatus for measuring various weights of material and to govern the amount of dribble feed.

The invention is shown by way of illustration in the accompanying drawings, in which:

Figure 1 is a side elevation of an automatic weighing machine constructed and arranged according to the invention, certain parts being shown in section, and certain other parts being broken away more clearly to reveal the construction;

Fig. 1a is a vertical section taken along line 1a—1a of Fig. 1;

Fig. 1b is an enlarged view of certain details of the invention shown in Fig. 1;

Fig. 3 is an end elevation of a battery of four automatic weighing machines like those illustrated in Figs. 1 and 2, the machines being viewed as from the left in Fig. 1; and Fig. 4 is a sectional elevational view of a variant form of gate for cutting off the main material supply to the batch hopper.

Figure 2:
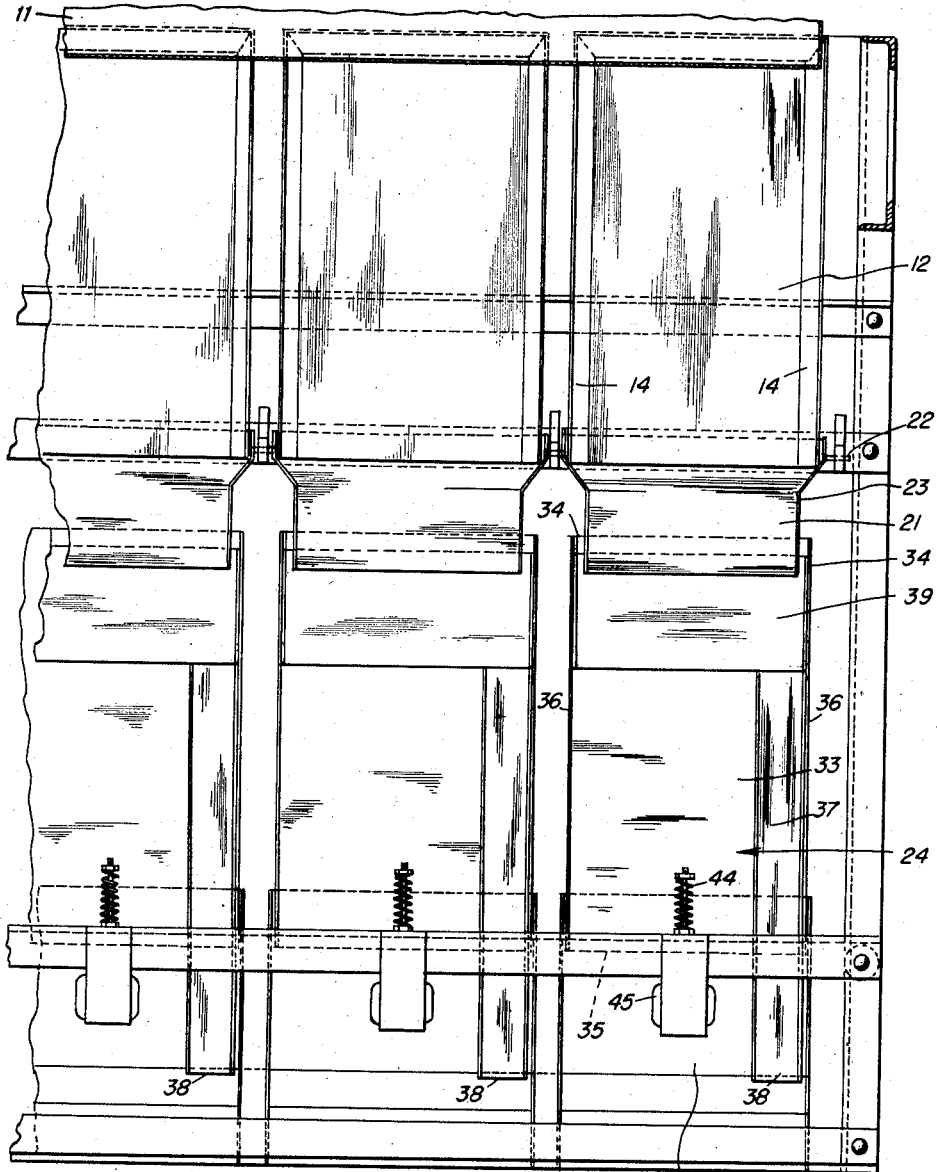
Fig. 2 is a vertical broken plan view of a battery of three weighing machines like that illustrated in Fig. 1.

In the embodiment of the invention which is illustrated in the drawings, there is shown an automatic weighing machine comprising a frame 10 upon which are mounted a source of discrete or flowable material to be weighed, a plurality of batch weighing apparatus, and means for rapidly moving from the source to the weighing apparatus, under control of the latter, exact net weight quantities of the material, all now to be described.

The source of material to be weighed is here shown as a supply bin 11 mounted upon the frame 10 above an initial vibratory supply trough 12 which receives material from the bin. The trough 12 has an upwardly turned back 13, upwardly turned sides 14 and an open delivery end 15. Material leaves the bin 11 through an opening 16 in its forward wall; and a door 17 is provided for sliding over the front wall of the bin to close or partly uncover the opening 16. Thus the door 17 controls the rate at which material may leave the bin. The position of the door 17 may be fixed, as by a wing nut 18.

Electrical vibrating means is provided for the initial vibratory trough 12 in the form of a spring-mounted vibrator 19 which supports the trough, as on a bracket assembly 20. The trough 12 is not inclined, and gravity is not relied upon to move the material along the trough. Flowable or discrete material passing from the bin 11 into the initial vibratory trough 12 tends to pile up locally in the trough according to its normal angle of static repose. Vibration, however, acts to flatten the pile of material beneath the bin in the horizontal trough. Since the vibratory motion given the trough cannot move the material past the raised back 13 and sides 14 of the trough, the flattening action caused by the vibration necessarily moves the material longitudinally of the trough, in a stream of substantially uniform depth, to its open end 15.

A control trough 21, is horizontally hinged at one end thereof, as at 22, to the frame 10 immediately beneath the delivery end 15 of the vibratory trough 12 to receive material discharged therefrom by vibration. The control trough 21 has sides 23 which straddle the sides 14 of the vibratory trough 12 in all positions of the former trough to prevent spillage of material as it is fed by the initial vibratory trough 12 to the control trough 21.

The control trough 21 is inclined sharply downwardly from the delivery end 15 of the initial vibratory trough 12 in order to feed by gravity discrete or flowable material from the initial vibratory trough to a vibratory main feeding trough 24. In order that material may not be fed to the vibratory main feeding trough 24 when not needed, the control trough 21 is counterbalanced by a counter-weight 25 upon a lever arm 26, coacting with a leaf-spring 27 which actuates a well-known type of switch 28. The switch 28 controls the circuit through the vibrator 19 through conductors 29 and 30. Obviously, an excessive load piling upon the control trough 21 will turn that trough in a contra-clockwise direction, as viewed in Fig. 1, against the action of the lever arm 26 and the counterweight 25 thereon. Thereupon, the leaf-spring 27 is released to open the switch 28 and stop the vibrator 19. Material then ceases to reach the control trough 21 from the initial vibratory trough. When the main feeding trough 24 has discharged sufficient material to relieve the control trough of its excess load, the counterweight 25 turns the control trough in a clockwise direction, as viewed in Fig. 1, causing the lever arm 26 to bear upon the leaf-spring 27, close the switch 28 and start the vibrator 19 again.

Electrical vibrating means is provided for the vibratory main feeding trough 24 in the form of a spring-mounted vibrator 31 which supports the trough, as on a bracket assembly 32. Like the initial vibratory trough 12, the vibratory main feeding trough is a horizontal trough. It advances the material therein in a manner already explained in connection with the initial vibratory trough 12.

The vibratory main feeding trough 24 comprises a base trough 33, having an upwardly and rearwardly sloping back 34, an open delivery end 35 and sides 36 extending substantially vertically from the bottom of the trough and being deeper where they join the back 34 than they are at the delivery end 35. Fixed within the base trough 33, resting upon its bottom and against one of its sides 36, is a dribble delivery trough 37. The bottom of the dribble trough 37 is considerably narrower than that of the base trough 33, and is here shown as about one-fifth that of the base trough. The depth of the dribble trough is also less than that of the base trough. Furthermore, the dribble trough 37 extends beyond the delivery end 35 of the base trough, for a purpose which will later appear.

A horizontal shelf 39 is fixed in the rear end of the base trough 33 at a level just above that of the top of the dribble trough 37. The rear edge of the horizontal shelf 39 is fixed in contact with the back 34 of the base trough 33, and lies immediately beneath the delivery end of the control trough 21, which carries the material from the initial vibratory trough to the horizontal shelf. When the main feeding trough 24 is vibrated, the horizontal shelf is vibrated therewith. Accordingly, the horizontal shelf 39 carries the material from the control trough 21 forwardly in a stream of substantially uniform depth and distributes it between the base trough 33 and the dribble trough 37 in accordance with their relative widths.

When the main feeding trough is not vibrated, material delivered upon the horizontal shelf 39 backs up upon the control trough 21 with results heretofore noted.

The delivery end 35 of the base trough 33 and the farther advanced delivery end 38 of the dribble trough 37 both overlie the top of a batch hopper 40, to which both troughs 33 and 37 feed the material to be weighed. Thus, as the main feeding trough 24 is vibrated, material flows along the base trough 33 and the dribble trough 37 and falls from their respective delivery ends into the batch hopper 40 to be weighed. Since the width of the dribble trough 37 is considerably narrower than that of the base trough 33, and since the vibrated horizontal shelf 39 distributes the material substantially evenly to both, the base trough delivers a considerably greater amount of material to the batch hopper 40 than does the dribble trough. As here illustrated, the base trough delivers substantially four times the amount of material delivered by the dribble trough.

In order that a precise net weight of material may be fed to the batch hopper 40 for each weighing, delivery of material by the base trough 33 is stopped when a predetermined weight of material somewhat less than the required net weight has been fed, and feed by the dribble trough 37 at a reduced volumetric rate is continued until the predetermined net weight has been completed. It is to be particularly noted that the reduced rate of feed by the dribble trough is entirely the result of its small cross-section as compared to that of the base trough. Delivery of material by the base trough 33 is stopped by a gate 41 movable to close the delivery end 35. The dribble trough, however, constitutes a form of dribble delivery passage extending past the gate 41, and delivery of material by it is stopped by stopping vibration of the main feeding trough 24. The delivery end 38 of the dribble trough remains open at all times.

The gate 41 is automatically operated to open and close the delivery end 35 of the base trough 33. As here shown the gate 41 is a brush which is carried by an arm 42 fixed to a rotatable shaft 43 mounted in the frame 10. Also fixedly mounted on said shaft 43 is a bell-crank lever 43a having arms 43b and 43c. A spring 44, suitably connected at one end to the frame 10 and at its other end to the arm 43c, acts to close the gate 41 and to hold it closed. A solenoid 45 also supported by the frame 10, and connected to the arm 43b by a conventional lever system 46, may be energized to overcome action by the spring 44 and to open the gate 41 and hold it open.

The batch hopper 40 is generally wedge-shaped with the edge of the wedge forming its lowest line. One side 47 of such wedge is fixed to a bracket 48 having a substantially triangular base 48a which, in turn, is fixed to the load receiver or pan 49 of the scales 50 of the weighing machine. The batch hopper 40 is so carried by the load receiver 49 that a vertical plane which passes through the center of gravity of the load and is parallel to the fulcrum of the scales will pass through a line x—x Fig. 1c in the triangular base 48a. The true weight of material in the batch hopper 40 will be accordingly transmitted by the lever system of the scales (not shown) to the pan 51 and the indicator 51a. A tare is, of course, carried by the pan 51 to compensate for the dead weight of the batch hopper and its appurtenances, as are also weights equal to the net weight of material to be weighed.

The other side of the wedge formed by the batch hopper 40 is constructed as an emptying gate 52 of the hopper, and is hinged at its top, as at 53, and meets at its bottom the bottom edge of the first-named wedge side 47 of the hopper. Extending upwardly from the pivot 53 to the top of the hopper is a further vertical side 54 thereof. The emptying gate is held in closed position by a closing spring 55 tensioned between an ear 56 projecting inwardly from the vertical side 54 of the hopper and an arm 57 projecting inwardly from the upper part of the gate adjacent its hinge 53. A latch 58, is fixed to each end of a shaft 58a pivoted in the gate and extending beyond the lateral edges thereof, and said shaft which is biased by a spring 59, engages a detent 60 mounted on each end of the hopper, and locks the gate 52 in closed position.

In order to discharge the weighed contents of the batch hopper 40, very simple means are provided for disengaging the latches 58 from the detents 60 and swinging the emptying gate 52 away from the side 47 of the hopper. To this end, a solenoid 61 is externally mounted upon the vertical side 54 of the hopper and is pivotally connected, by a lever system 62 and a suitably connected tie rod 63 and connecting link 63a to the shaft 58a and hence, to the latches 58. Upward movement of the solenoid core successively disengages the latches 58 from the detents 60 and swings the emptying gate 52 outwardly against the tension applied thereto by the closing spring 55. When the solenoid 61 is de-energized, the closing spring 55 again pulls the emptying gate closed and the latches 58 so lock it.

Figure 1C:
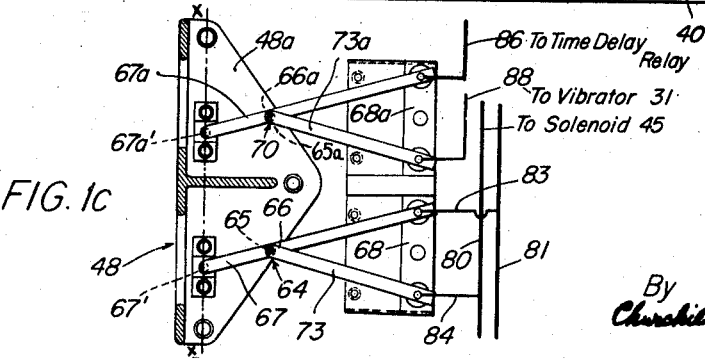
Fig. 1c is a horizontal section taken along the line 1c—1c of Fig. 1b.

The automatic weighing machine of the invention is so conceived and constructed that, after the main switch (not shown) is closed, the entire operation is automatic, and is controlled by the weight in the batch hopper 40. Thus, electrically operated means are provided, controlled by the position of the batch hopper, for governing directly or indirectly the entire operation of the machine, as will presently be described. To this end, electric switches 64 and 70 of similar construction are mounted upon the scales 50 and the contacts of said switches are so related to be successively opened when predetermined weights of material depress the load receiver 49 of the scales, and which contacts are closed when the hopper is empty or contains less than the requisite weights of material respectively. As shown in Figs. 1, 1b and 1c, said switches each consists of a pair of vertically spaced, horizontal, resilient, metallic arms 67 and 73 and 67a, and 73a, respectively, disposed angularly to each other with one end of each of said arms fixedly secured in housings 68 and 68a respectively. The opposite end of each of said arms 67 and 67a overlies a stud 67' and 67a' respectively, mounted on the base 48a along the line x—x. Where the arms 67 and 73 overlie one another they are provided with electrical contacts 65 and 66 respectively, and where the arms 67a and 73a overlie one another they are provided with electrical contacts 65a and 66a respectively.

Operation of the solenoid 45 to close the gate 41 at the delivery end of the base trough 33 is controlled by the switch 64. With the hopper empty or under a load less than the predetermined value, the stud 67' engages and stresses the arm 67 upwardly, which in turn through the contacts 65 and 66 also stresses the arm 73 upwardly. When the predetermined weight of material is in the hopper, however, the stud 67' will have moved downwardly to a position where it no longer stresses the arm 67 whereupon the arms 66 and 73 reassume their normal horizontal vertically spaced relation and engagement between the contacts 65 and 66 is broken. Adjustment of the contacts 65 and 66 to permit opening of the switch 64 under any desired load in the batch hopper 40 is very simply made. The fixed end of the resilient arm 73 which is carried in the housing 68 is vertically adjustable by means of a wing-headed bolt 69 in an obvious mechanical manner. Thus, the contacts 65 and 66 will be separated at a selected point of depression of the load receiver 49, corresponding to a predetermined weight of material in the batch hopper 40.

The switch 70 controls operation of the vibrator 31 which supports and vibrates the main feeding trough 24. The switch 70 is quite similar to the switch 64 and merely differs therefrom in the spacing of the contacts 65a and 66a.

In order to prevent the downwardly moving load receiver 49 from prematurely breaking the contacts 65a, 66a due to the downward momentum of the load receiver, after breaking the contacts 65, 66, there is suspended over the pan 51 a minor weight 51b supported in socket 50a in the arm of a bracket 50b carried by the scales housing, said minor weight being adapted to be picked up by the weight pan substantially simultaneously with the breaking of contacts 65, 66. The minor weight 51b is equal to the difference between the weight which will operate to break the contacts 65, 66 and the net weight of material to be weighed. The pick-up of the minor weight 51b has a damping action on the scales and thus assures of the addition of material by the dribble feed before contacts 65a, 66a are broken.

The switches 64 and 70 are shown as related to the load receiver 49 in such manner that depression of the batch hopper 40 and the load receiver first opens the switch 64 and then the switch 70. Accordingly the gate 41 is closed with the hopper under one load, and the vibrator 31 is stopped with the hopper under a greater or net weight load.

The electrical circuits employed are a matter of well understood electrical design, and it is considered that the invention may be fully explained by reducing the disclosure of such circuits to simplest form.

In most uses of the disclosed automatic weighing machine, it is of importance to discharge the contents of the batch hopper 40 when the material therein is needed in a subsequent operation (as in a packaging machine) rather than immediately upon deposit of a predetermined weight of material therein. Accordingly, separate conductors 75 and 76 are shown for the emptying gate-opening solenoid 61, which may be suitably connected with the apparatus to which the weighed batches of material are delivered. A time delay relay 77 is shown as included in this circuit for a purpose which will later appear.

The switch 28 which controls the vibrator 19 is shown as connected by conductors 78 and 79 to the leads 80 and 81 of a source of E.M.F. 82, all conventionally illustrated. Furthermore, the contact 65 of the switch 64 is illustrated as connected through the arm 67 by a conductor 83 to the lead 81; and the coacting contact 66 is shown as connected through the arm 73 and through a conductor 84 to the gate-opening solenoid 45. The circuit is completed by a conductor 85 between the solenoid 45 and the lead 80. Thus, separation of the contacts 65 and 66 breaks the circuit through the solenoid 45 and allows the spring 44 to close the gate 41.

The contact 65a of the switch 70 is shown as connected through the arm 67a by a conductor 86 to the time delay relay 77 and thence through a conductor 87 to the lead 81. The second contact 66a of the switch 70 is connected through the arm 73a and thence through a conductor 88 to the vibrator 31, whence the circuit is completed by a conductor 89 between the vibrator and the lead 80. Accordingly, separation of the contacts 65a and 66a of the switch 70 breaks the circuit through the vibrator 31 and halts its action. The time delay relay 77 in this circuit is operated when the circuit through the gate-opening solenoid 61 is closed to open the emptying gate 52. Discharge of the hopper 40 and reduction of the weight on the load receiver 49 which immediately closes the switch 70 will not, therefore, restart the vibrator 31 at once. By this means material is prevented from being fed to the batch hopper and leaving it after one weighing has been completed and before the next weighing is effected. The emptying gate is closed so quickly, following de-energization of the gate-opening solenoid 61, that a time delay of only a fraction of a second suffices for this purpose.

From the foregoing, operation of the apparatus will be readily understood. The contacts 65, 66 and 65a, 66a of the switches 64 and 70, respectively, are adjusted as already described so that the switch 64 will be opened when a predetermined load slightly less than the desired net weight has been added to the batch hopper 40, and so that the switch 70 will be opened when exactly the desired net weight load has been fed to the hopper. With the batch hopper 40 empty, the emptying gate 52 closed, the gate 41 at the delivery end 35 of the main feeding trough 24 open, the control switches 64 and 70 closed, and the vibrators 19 and 31 operating, material is fed to the batch hopper 40. Accordingly, material moves by gravity out of the supply bin 11 into the initial vibratory trough 12, along which it is moved by vibration into the control trough 21. The material slides downwardly by gravity in the control trough to the horizontal shelf 39 in the main feeding trough 24, vibration of which distributes the material to the base trough 33 and the dribble trough 37 into which the main feeding trough is divided, according to their relative width. Continuing vibration of the main feeding trough advances the material in steady streams along the base trough and the dribble trough to their respective delivery ends 35 and 38 from which the material falls into the batch hopper 40.

When the described operation has delivered to the batch hopper 40 a predetermined weight of material somewhat less than the desired net weight, the load receiver is depressed sufficiently to separate the contacts 65 and 66. Thereupon the solenoid 45 is de-energized and the spring 44 closes the gate 41 across the delivery end 35 of the base trough. Since the base trough delivers several times as much material as does the dribble trough, the major part of the material delivery is thus cut off. Thereafter but a thin stream of material is added to the hopper through the delivery end of the dribble trough 37.

When the dribble trough has added to the batch hopper 40 the last increment of material to make up the desired net weight and thus counterbalancing the pick-up weight 51b the load receiver 49 is depressed sufficiently to separate the contacts 65a and 66a of the switch 70. Thereupon the circuit through the vibrator 31 is broken, vibration of the main feeding trough 24 ceases, and no more material falls from the delivery end of the dribble trough.

Meantime vibration of the initial vibratory trough 12 continues, and material piles up on the horizontal shelf 39, thereby assuring an ample supply of material for resumption of feed by the main feeding trough 24. When such piled-up material imposes sufficient load on the control trough 21, vibration of the initial vibratory supply trough 12 is halted in the manner already described.

Operation of the vibrator 31 is prevented by the time delay relay 77 in its operating circut until after the emptying gate 52 of the batch hopper is closed, as already described. However, with the emptying gate closed, the hopper empty, and the switches 64 and 70 closed, the gate 41 opens the delivery end 35 of the base trough 33, the vibrator 31 is started, and renewed feeding of material to the batch hopper is begun. As vibration of the main feeding trough 24 is resumed, the excess material on the horizontal shelf 39 prevents any diminution of material supply, and forward movement of this material relieves pressure on the control trough 21 which causes resumption of vibration of the initial vibratory trough 12.

Certain refinements of the apparatus as heretofore described are also contemplated by the invention. In order that, when weighing small batches of material in the hopper 40, the net weight may not be attained and the vibration stopped while additional material is still falling from the dribble trough, a forwardly inclined shelf 90 is transversely fixed in the batch hopper closely beneath the delivery end 38 of the dribble trough 37, and a sub-gate 91 is fixed to the emptying gate 52 to meet the lower edge at the shelf 90 to form an elevated sub-hopper in the main hopper. Thus, material fed by the dribble trough is substantially immediately added to the weight of material in the hopper. Opening of the emptying gate 52 opens the sub-gate 91 fixed to it, thereby at once adding the contents of the sub-hopper to the material leaving the main batch hopper.

Where net weights of material such as coffee beans or smaller units are to be weighed, it has been found possible to dispense with the dribble trough and to close the delivery end of the undivided main feeding trough with a gate 41a of sheet material and dribble through a dribble delivery passage in the form of a cut-out area 92 in the bottom of the gate 41a (Fig. 4). Thus the cut out area 92 in the gate 41a constitutes a form of dribble delivery passage extending past the gate 41a. Otherwise, the construction and operation of the automatic weighing machine are as already described.

Automatic weighing machines according to the invention are relatively inexpensive, are economical in the use of power because no elements of appreciable mass and no substantial inertia factors are involved, are rugged, and are exceedingly rapid in operation since a minimum time delay intervenes between emptying the batch hopper and resuming full feed and since the control switches 64 and 70 may be set to effect a minimum of dribble. Furthermore, being electrically operated the timing of such machines is precise, and they may be operated in batteries of time-synchronized, sequentially emptying units.

The forms of the invention here described and illustrated in the accompanying drawings are presented merely to indicate how the invention may be applied. Other forms, embodiments and applications of the invention will, of course, suggest themselves to those skilled in the weighing art.

What we claim is:

1. In an automatic weighing machine comprising weighing scales, a batch hopper having a main hopper portion and a supplemental hopper portion operatively attached to said scales for weighing material supplied to said hopper, a vibratory main feeding trough for feeding flowable material to the batch hopper to be weighed, said trough being divided into a base trough for feeding material to be weighed into the main hopper portion and a dribble trough considerably narrower than the base trough for feeding material to be weighed to the supplemental hopper portion, the delivery ends of said base trough and dribble trough overlying the respective hopper portions with the delivery end of the dribble trough spaced closer to the bottom of the supplemental hopper portion than is the delivery end of the base trough with respect to the bottom of the main hopper portion, a feed cut-off gate positioned to open and close the delivery end of said base trough to permit delivery of material to said hopper after said gate is closed only by said dribble trough; electrically operated means controlled by the position of said hopper for opening said feed cut-off gate and providing for supply of material through said base trough and said dribble trough and for successively closing said feed cut-off gate and for stopping delivery of material through said dribble trough and said batch hopper having an emptying gate controlling the substantially simultaneous discharge of material from both hopper portions when the gate is opened.

2. In an automatic weighing machine comprising weighing scales, a batch hopper operatively attached to said scales; a vibratory main feeding trough for carrying a supply of flowable material to said hopper to be weighed, said trough being divided into a base trough extending above said hopper and a dribble trough considerably narrower than said base trough extending in like direction beyond said base trough above said hopper; a feed cut-off gate positioned to open and close the delivery end of said base trough to permit delivery of material to said hopper after said gate is closed only by said dribble trough; electrically operated means controlled by the position of said hopper for opening said feed cut-off gate and providing for supply of material through said base trough and said dribble trough and for successively closing said feed cut-off gate and for stopping delivery of material through said dribble trough, said hopper having an emptying gate, hinged at its top, beneath the delivery end of said dribble trough; said hopper also having transversely fixed therein a forwardly inclined shelf closely beneath the delivery end of said dribble trough, and a sub-gate fixed to the emptying gate of said hopper to meet the lower edge of the forwardly inclined shelf to form an elevated sub-hopper in said hopper beneath the delivery end of said dribble trough; whereby material fed by said dribble trough to said sub-hopper is added to the weight of material in said hopper substantially immediately, and whereby material in the sub-hopper formed by said shelf and said sub-gate is at once added to other material leaving said hopper when said emptying gate is opened.

References Cited in the file of this patent

UNITED STATES PATENTS

| | | |
|---|---|---|
| 975,158 | Richardson | Nov. 8, 1910 |
| 1,120,299 | Fleming | Dec. 8, 1914 |
| 1,580,669 | Nagel | Apr. 13, 1926 |
| 2,071,443 | Weckerly | Feb. 23, 1937 |
| 2,139,903 | Mason et al. | Dec. 13, 1938 |
| 2,260,718 | Merrifield | Oct. 28, 1941 |
| 2,332,600 | Rapp | Oct. 26, 1943 |
| 2,333,435 | Muskat | Nov. 2, 1943 |
| 2,352,114 | Muskat | June 20, 1944 |
| 2,443,350 | Gilbert et al. | June 15, 1948 |
| 2,466,386 | Curioni | Apr. 5, 1949 |
| 2,614,786 | Caron et al. | Oct. 21, 1952 |
| 2,626,042 | Aldridge | Jan. 20, 1953 |
| 2,629,032 | Brown | Feb. 17, 1953 |
| 2,726,061 | Schresser et al. | Dec. 6, 1955 |

FOREIGN PATENTS

| | | |
|---|---|---|
| 110,451 | Sweden | Apr. 25, 1944 |